United States Patent Office 2,774,773
Patented Dec. 18, 1956

2,774,773

PROCESS FOR THE PRODUCTION OF 2,3,5-TRIALKOXY-TETRAHYDROFURANES

Arthur Stoll, Arlesheim, Ernst Jucker, Binningen, and Adolf Lindenmann, Basel, Switzerland, assignors to Sandoz A. G., Basel, Switzerland No Drawing. Application June 21, 1954,
Serial No. 438,332

Claims priority, application Switzerland June 24, 1953

5 Claims. (Cl. 260—347.8)

The present invention relates to 2,3,5-trialkoxy-tetrahydrofuranes and to the preparation thereof.

More particularly, the invention is especially concerned with the 2,3,5-trialkoxy-tetrahydrofuranes which correspond to the formula

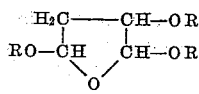

wherein R stands for $CH_3$, $-CH_2CH_3$, $-CH_2CH_2CH_3$ or $-CH(CH_3)_2$, and to the preparation thereof by dissolving furane in an alcohol of the formula

wherein R has the aforesaid significance, and then treating the resultant solution with chlorine or bromine in the absence of hydrogen halide-binding agents. The following scheme illustrates the course of the reaction:

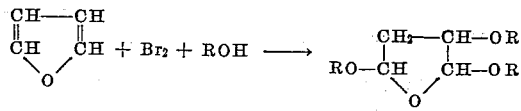

It is known that furane reacts with halogen in the presence of an alcohol; however, this reaction is always carried out in the presence of a hydrogen halide-binding agent, such for example as sodium carbonate or ammonia, so that the reaction stops with the formation of the 2,5-dialkoxy-dihydrofurane.

A primary object of the present invention is the embodiment of a modification of the said process whereby the reaction proceeds to the production of the 2,3,5-trialkoxy-tetrahydrofuranes. This object is achieved, according to the invention, by carrying out the reaction between the furane and the halogen in the absence of any agent for binding hydrogen halide.

Briefly stated, the process is carried out as follows:

Furane is dissolved in the alcohol, e. g. absolute ethanol, and then the calculated quantity (1 mol) of halogen, e. g. bromine, is added while stirring thoroughly. Upon completion of the reaction, the reaction mixture is poured into an aqueous calcium chloride solution, and is then extracted with an organic solvent, e. g. ether. The resultant extract is washed with saturated aqueous sodium carbonate solution, dried over potassium carbonate, and the organic solvent then distilled off. The residue is fractionally distilled, e. g. under reduced pressure.

The 2,3,5-trialkoxy-tetrahydrofuranes obtained in this way are water-white compounds which are liquid at room temperature (about 20 to about 30° C.) and which can be distilled without decomposition. They have a high solvent capacity for certain organic products and can therefore be used as specific solvents, e. g. in connection with hydrogenations. In this respect, the said compounds are similar to the long-known methylal. Furthermore, the 2,3,5-trialkoxy-tetrahydrofuranes are excellently suited for use as solvent in Grignard reactions which have to be carried out at relatively high temperature. The products of the invention are also useful as insecticides, more particularly against ants. To this end, use is advantageously made of solutions of the compounds in a hydrocarbon oil. The habitat of the ants may be painted or otherwise coated with the thus-produced "insecticide paint." Slow hydrolysis of the furane compound takes place, e. g. by the action of atmospheric moisture, with formation of the corresponding O-alkyl malic acid dialdehyde which is effective in controlling ants. The aforesaid insecticide paint is resistant to the action of rain and is long acting. The products of the invention also have a resin utility in that, following saponification to the corresponding dialdehydes, they may be condensed with e. g. urea to yield condensation products which are useful as plasticizers for cellulose resins.

The following examples represent illustrative embodiments of the invention. The parts are parts by volume. The temperatures are in degrees centigrade.

Example 1

A mixture of 42 parts of bromine and 600 parts of absolute methanol are added dropwise, while stirring vigorously, to a mixture of 110 parts of furane and 500 parts of absolute methanol at a temperature of —20° to —2°. The reaction mixture is poured into 2500 parts of saturated aqueous calcium chloride solution, the mixture extracted with ether, and the ethereal extract shaken out with 250 parts of saturated aqueous sodium carbonate solution, dried over potassium carbonate and the ether distilled off. The residue is subjected to repeated fractional distillation under reduced pressure, whereupon 2,3,5-trimethoxy-tetrahydrofurane — which boils at 72–80° under a pressure of 14 mm. Hg—is obtained.

Example 2

A mixture of 83 parts of bromine and 1000 parts of absolute ethanol is added dropwise, while stirring vigorously, to a mixture of 221 parts of furane and 1200 parts of absolute ethanol at a temperature of —20° to —2°. At the end of another hour's stirring, the reaction mixture is poured into 5000 parts of saturated aqueous calcium chloride solution, then extracted with a total of 3000 parts of ether, and the ethereal extract shaken out with 350 parts of saturated aqueous sodium carbonate solution, dried over potassium carbonate and the ether distilled off. The residue is subjected to repeated fractional distillation under reduced pressure, whereupon 2,3,5-triethoxy-tetrahydrofurane—which boils at 90–98° under a pressure of 15 mm. Hg—is obtained.

Example 3

The procedure according to Example 2 is essentially repeated, except that the ethanol is replaced by n-propanol. The product is 2,3,5-tripropoxy-tetrahydrofurane, boiling at 110–112° under a pressure of 12 mm. Hg.

Example 4

The procedure according to Example 2 is essentially repeated, except that the ethanol is replaced by isopropanol. The product is 2,3,5-triisopropoxy-tetrahydrofurane, boiling at 104–105° under a pressure of 14 mm. Hg.

Example 5

This example demonstrates the use of 2,3,5-trialkoxy-tetrahydrofurane as a solvent during hydrogenation. It is known, for example, that the reduction of tropinone with sodium and alcohol yields chiefly ψ-tropine; the reduction in the presence of precious metal catalysts results in a mixture composed of tropine and ψ-tropine. However should tropinone in a solution of 2,3,5-trimethoxytetrahydrofurane be hydrogenated in the presence of Raney-nickel a uniform tropine is obtained in theoretical yields:

2.0 parts by weight of tropinone in 5 parts of 2,3,5-trimethoxytetrahydrofurane are placed in an autoclave with 0.20 part by weight of Raney-nickel and hydrogenated for 5 hours at a temperature of 40–50° and a beginning pressure of 60 atmospheres. The hydrogenated mixture is taken up in 20 parts of ether, filtrated from the catalyst, ice-cooled and twice extracted with 50 parts of 1-N-hydrochloric acid each time. Potassium carbonate is added to the combined aqueous layers until alkalinity and several extractions are then made using a total of 200 parts of ether. The ether extracts evaporated and dried over potassium carbonate consist of tropine, which after distillation in vacuum display characteristics as described in the literature.

*Example 6*

This example demonstrates the use of 2,3,5-trialkoxytetrahydrofuranes as solvents in Grignard reactions. Here the replacement of ether by a 2,3,5-trialkoxytetrahydrofurane is of advantage when the reaction must be carried out at a relatively high temperature or when the reaction product has a boiling point similar to that of ether, thus making separation more difficult. Both these conditions are fulfilled by the use of 2,3,5-trimethoxytetrahydrofurane in the preparation of n-pentane:

To 36 parts by weight of magnesium chips are added 20 cc. of a solution of 225 parts by weight of 2-bromopentane in 150 parts by weight of 2,3,5-trimethoxytetrahydrofurane. As soon as the reaction commences and after the addition, while stirring, of 150 parts by weight of 2,3,5-trimethoxytetrahydrofurane the rest of the solution is added at such a rate that the temperature reaches 50–60°. Then the mixture is warmed for one hour on the water bath. The solution of the Grignard compound is then added drop-wise to 1000 parts of warm 5-N-sulfuric acid whereby the n-pentane is continuously distilled off and caught in an ice-cooled container. After addition of all of the Grignard solution the mixture is heated on a water bath until n-pentane no longer distills off. The n-pentane dried over potassium carbonate boils at 35.5–36.5° after double fractionation.

In the preceding examples, the bromine may be replaced, with equal success, by the corresponding quantity of chlorine.

Having thus disclosed the invention what is claimed is:

1. A process for the preparation of a 2,3,5-trialkoxy-tetrahydrofurane corresponding to the formula $$\begin{array}{c} H_2C\text{———}CH\text{—}OR \\ | \quad\quad\quad | \\ RO\text{—}CH \quad CH\text{—}OR \\ \diagdown\ O\ \diagup \end{array}$$

wherein R stands for a member selected from the group consisting of $CH_3$, $-CH_2CH_3$, $-CH_2CH_2CH_3$ and $-CH(CH_3)_2$, which comprises treating furane with a member selected from the group consisting of chlorine and bromine in an excess of an alcohol of the formula

R.OH wherein R has the aforesaid significance, in the absence of a hydrogen halide-binding agent, at a temperature of −20° to −2° C., whereby trialkoxylation results.

2. A process for the preparation of 2,3,5-trimethoxy-tetrahydrofurane, which comprises treating furane with bromine in an excess of methanol in the absence of a hydrogen halide-binding agent, at a temperature of −20° to −2° C., whereby trialkoxylation results.

3. A process for the preparation of 2,3,5-triethoxy-tetrahydrofurane, which comprises treating furane with bromine in an excess of ethanol in the absence of a hydrogen halide-binding agent, at a temperature of −20° to −2° C., whereby trialkoxylation results.

4. A process for the preparation of 2,3,5-tripropoxy-tetrahydrofurane, which comprises treating furane with bromine in an excess of n-propanol in the absence of a hydrogen halide-binding agent, at a temperature of −20° to −2° C., whereby trialkoxylation results.

5. A process for the preparation of 2,3,5-triisopropoxy-tetrahydrofurane, which comprises treating furane with bromine in an excess of isopropanol in the absence of a hydrogen halide-binding agent, at a temperature of −20° to −2° C., whereby trialkoxylation results.

References Cited in the file of this patent

UNITED STATES PATENTS

| 2,465,988 | Jones | Apr. 5, 1949 |
| 2,475,097 | Jones | July 5, 1949 |

OTHER REFERENCES

Clauson-Kass et al.: Acta. Chim. Scand. 2 109–115 (1948).

Fakstorp et al.: JACS 72 pp. 869–874 (1950).

Stoll et al.: Helv. Chim. Acta. 35, p. 1265 (1952).